CHARACTER RECOGNITION SYSTEM EMPLOYING A PLURALITY OF SPACED SERIAL TRANSDUCERS

Filed March 26, 1963

INVENTOR
BILLY G. WOOD
BY Paul M. Brannen
AGENT 3,247,483
Patented Apr. 19, 1966

3,247,483

CHARACTER RECOGNITION SYSTEM EMPLOYING A PLURALITY OF SPACED SERIAL TRANSDUCERS

Billy G. Wood, Apalachin, N.Y., assignor to International Business Machines Corporation, New York, N.Y., a corporation of New York Filed Mar. 26, 1963, Ser. No. 268,001
4 Claims. (Cl. 340—146.3)

Figure 1:
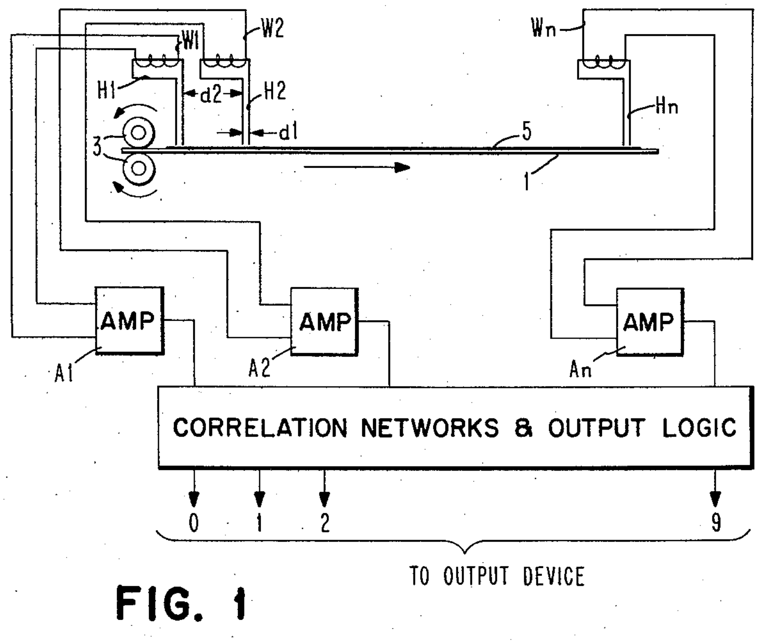

The present invention relates to character recognition systems and particularly to an improved form of character recognition system of the so-called single scan or single track type.

In systems of the type mentioned, each of the characters to be recognized is scanned in a single pass across the character, the scanning path usually being at least as wide as the height of the character plus a suitable allowance for character misalignment. In systems of this type, as previously known, it has been the usual practice to provide a single scanning transducer, the active area of which is arranged to span the entire width of the character track, including the misalignment tolerance portion. One such system is shown and described in U.S. Patent No. 2,924,812, in which magnetizable characters on a record medium are scanned by a magnetic reading head having a single gap which extends transversely to the direction of character motion through a distance equal to the maximum character height plus maximum misalignment tolerance.

As shown in FIG. 6 of the mentioned reference, signals generated by the passage of the magnetized characters past the single gap reading head are supplied through an amplifier and filter to a delay line, having a plurality of paths or outputs therefrom, which outputs are supplied to a plurality of correlation networks, such as resistor matrices, and suitable logic circuits to provide outputs indicative of characters scanned. The delay line functions to contain the entire waveshape generated by the character as it passes underneath the single gap reading head, so that the entire waveshape may be examined for amplitude relationships at various portions along its time axis. Since the characters are each different, one from the other, the waveshapes provided by scanning these characters will each be different and, accordingly, suitable correlation networks can be supplied, one for each character, which will provide an output through suitable logic circuits when and only when a waveshape distinctive of that character is present in the delay line.

The present invention is an improvement over systems of the type described, in that it utilizes a plurality of transducers, closely spaced, and spread over a distance equal to the width of the characters to be recognized. This plurality of transducers supplies energy through suitable amplifiers to correlation networks and logic circuits which may be similar to those shown in the subject application, so that the effect of a plurality of transducers is the same as using a single transducer plus the delay line. The principal advantage of this arrangement is the fact that the system is not dependent upon the variations in speed of the document transport. That is to say, in systems using a delay line, the document transport speed must be held relatively constant, since the electrical parameters of the delay line are fixed and cannot accommodate waveshapes which occupy more or less total time than that for which they are designed. Accordingly, if the document transport speed changes from that for which the system is normally designed, the waveshapes provided in the delay line and to the inputs of the correlation networks will vary, and misreading of characters can thereby occur. In the present instance, since the inputs to the correlation networks occur at the same relative time intervals irrespective of the speed of the document transport, it can be seen that the system is independent of transport speed.

Accordingly, it is an object of the present invention to provide an improved character recognition system of the single track type.

Another object of the present invention is to provide an improved character recognition system of the single track type having a plurality of transducers arranged along the path of travel of the characters.

Another object of the invention is to provide a single track character recognition system employing a plurality of transducers which is relatively free from dependence on the operating speed of the document transport which carries the characters to be recognized past the transducers.

The foregoing and other objects, features and advantages of the invention will be apparent from the following more particular description of a preferred embodiment of the invention, as illustrated in the accompanying drawings.

In the drawings:

FIG. 1 of the drawings is a schematic diagram of a character recognition system for reading magnetizable characters, in accordance with a preferred embodiment of the invention.

Figure 2:
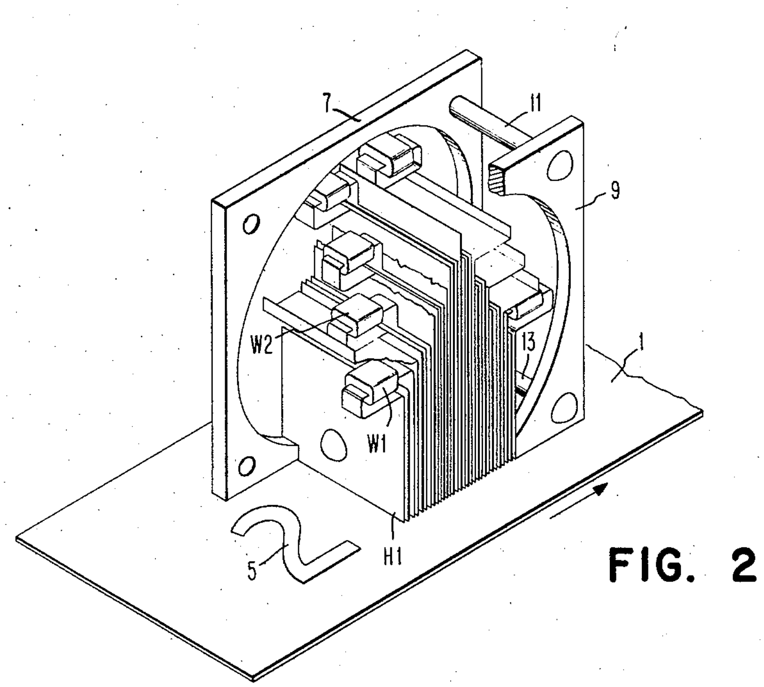

FIG. 2 is a diagrammatic view of one form which the multiple serial gap transducer may take when used in the present invention.

Similar reference characters refer to similar parts in each of the several views.

Referring to the drawings, FIG. 1 shows a record card 1 in cross-section, which is transported past a reading station by suitable record card feeding means, the details of which are not illustrated since they are not pertinent to the invention, but which may include a pair of feed rolls 3 which propel the card in the direction indicated by the arrow; i.e., from left to right. On the surface of the card there are provided magnetized characters, indicated diagrammatically by the heavy shaded portions.

The object of the present invention is to provide an improved method of reading such characters as they are successively fed past the reading station by the motion of the record card. The reading station comprises a plurality of reading heads such as the heads H1, H2 . . . H*n* which are arranged serially along the path of the characters which are to be recognized. Each of the reading heads such as H1 or H2 comprises a magnetic core with a suitable winding thereon, such as the windings W1 and W2 associated with the reading heads H1 and H2. The operation of the heads is conventional in that changes in the magnetic field present across the non-magnetic gaps at the lower ends of the cores will induce voltages in the associated windings, in the usual fashion.

As many heads are provided as is necessary to properly span the character. For example, eight heads side by side could be used for characters of a particular width.

The gap at the lower end of the core laminations indicated by the dimension $d1$ may be of the order of .002 to .003 of an inch. The spacing between the successive head laminations indicated by the dimensions $d2$ can be chosen to cover the distance between the heads in such manner that the magnetizable characters passing thereunder will be sampled at appropriate intervals; for example, with dimension $d1$ of the order of .002 to .003 of an inch, $d2$ may be of the order of .013 of an inch. This distance, of course, can vary in accordance with the design of the system and the dimensions given are exemplary only. The outputs of each of the head windings, such as W1, W2, and W*n*, are connected to the inputs of suitable amplifiers A1, A2, and A*n*, the details of which are not shown since they are of conventional design and their detailed structure forms no part of the present invention. The output of each of the amplifiers is supplied to a terminal of suitable correlation networks and output logic which may be of the type as shown and described in U.S. Patent No. 2,924,812 and corresponds to that portion of the system shown in FIG. 6 of the referenced patent, following the delay line designated by reference character 56.

As described in the referenced patent, the waveshapes applied to the correlation networks in response to the induction of voltages in the windings of the reading head are sampled at various points and their relative amplitudes are determined; and, since the characters to be read are such that a unique waveshape is provided for each and every character, the correlation networks together with the associated output logic will provide outputs on suitable output lines as indicated in FIG. 1, following the supply to the correlation network and output logic of a waveshape corresponding to a particular character. It should be apparent, as the magnetized character area 5 passes successively under the plurality of reading heads H1, H2 . . . H*n*, that the output voltages provided therefrom will, at the time the entire character has passed under the head, correspond to the voltages seen at predetermined sampling points along a delay line to which the waveshape has been provided by a single reading head as shown in the prior system.

Referring now to FIG. 2 of the drawings, there is shown a diagrammatic cut-away view of a multiple gap head construction of one type which may be employed in connection with the invention. As shown in the figure, the structure comprises two side frames 7 and 9, spaced apart by suitable spacers such as 11 and 13. The structure shown in FIG. 2 includes eight serial reading heads arranged in sequence, each of which may comprise one or more magnetic laminations, arranged in a generally L-shaped loop, with the leg of the loop turned out to one side or the other and dimensioned to carry thereon the winding associated with that particular gap. Spacer sheets of non-magnetic material are inserted between the portions of the lamination forming the legs of the loop and are also provided between the individual head structures. Also, the turned out portions of the loops are staggered as shown in order to accommodate all of the windings. Magnetic shielding material may be provided between the out-turned legs of each of the gaps, as shown, in order to guard against unwanted inductive reactions between the magnetic influences set up in each of the heads comprising the assembly. This structure is shown as it would be related to a magnetized character 5 passing thereunder on a record medium 1 in the direction illustrated by the arrow, the action being the same as that described previously in connection with FIG. 1 of the drawings.

From the foregoing, it will be seen that the present invention provides an improved form of character recognition system in which the characters are recognized by producing unique electrical waveshapes for each of the characters as a result of passing the characters under a plurality of transducers, which are arranged so that their outputs are supplied to suitable correlation networks in such manner that the electrical outputs of the transducers as a character passes completely thereunder will be supplied to the correlation networks and to output logic connected therewith in such fashion that a unique output will be provided for each of the characters. It can be seen that no time constants are involved, such as found in delay line type systems; and, accordingly, the speed of the document transport can vary without affecting the operation of the recognition system. It will be apparent to those skilled in the art that the structure employed for the plurality of serially arranged transducers can be varied and the arrangement shown in FIG. 2 is to be considered as only an exemplary embodiment of one type of construction which might be employed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A character recognition system comprising, in combination:
   - a plurality of correlation networks and output logic circuits, one for each character to be recognized,
   - said correlation networks and output logic circuits being effective to provide an indication of a character scanned when supplied with a plurality of electrical scanning signals corresponding to the scanning of predetermined portions of the character, and
   - scanning transducer means for supplying scanning signals to said plurality of correlation networks, comprising
   - a plurality of transducer elements spaced in the direction of scanning of the characters, said plurality of elements spanning the width of the widest character to be recognized, each of said elements having an effective length at least as great as the maximum height of the characters to be recognized.

2. A magnetic ink character recognition system comprising in combination:
   - a magnetic field transducer including a plurality of magnetic core elements arranged serially along the path of the characters to be read so that magnetized characters pass the elements serially, each of said elements having an effective length greater than the height of the characters to be read,
   - a plurality of windings, one for each of said elements and mounted thereon,
   - a plurality of correlation networks and logic circuits, one for each character to be recognized, and
   - means coupling said plurality of windings to said plurality of correlation networks so that the signals induced in said windings by the passage of magnetized characters are supplied to said correlation networks to provide an output indicative of the character scanned.

3. A character recognition system comprising, in combination:
   - transducer means including a plurality of sensing elements disposed serially along a scanning path for characters to be recognized, each of said elements having an effective length greater than the height of the characters and said plurality of elements, when assembled, spanning the width of the widest character to be recognized and being effective to provide an electrical signal in response to the scanning of a character as it passes said element, and
   - a plurality of recognition correlation networks, one for each character to be recognized, said networks having a plurality of inputs connected to said sensing elements to receive signals therefrom, and each of said networks having an output indicative of the character scanned by said transducer means.

4. A magnetic transducer for magnetic ink character recognition systems comprising, in combination:
a plurality of magnetic core laminations, each formed in a loop having an open end to act as a non-magnetic cap, a plurality of windings mounted on a portion of the associated laminations, and
means for mounting said plurality of laminations in side-by-side relation, said laminations having an active cap length at least as long as the highest of the characters, and said laminations when assembled spanning at least the width of a character.

References Cited by the Examiner

UNITED STATES PATENTS

| | | | |
|---|---|---|---|
| 2,531,642 | 11/1950 | Potter | 340—174.1 |
| 2,700,588 | 1/1955 | Williams et al. | 340—174.1 |
| 2,785,233 | 3/1957 | Stuart | 340—174.1 |
| 2,924,812 | 2/1960 | Merritt et al. | 340—146.3 |
| 2,985,863 | 5/1961 | Buslik | 340—146.3 |
| 2,012,233 | 12/1961 | Greanias et al. | 340—146.3 |
| 3,069,079 | 12/1962 | Steinbuch et al. | 340—146.3 |
| 3,109,065 | 10/1963 | McNaney | 340—146.3 |
| 3,125,683 | 3/1964 | Stewart et al. | 340—146.3 |

FOREIGN PATENTS

| | | |
|---|---|---|
| 921,658 | 3/1963 | Great Britain. |
| 615,181 | 1/1961 | Italy. |

MALCOLM A. MORRISON, *Primary Examiner.*